US008660145B2

(12) United States Patent
Carmon et al.

(10) Patent No.: US 8,660,145 B2
(45) Date of Patent: Feb. 25, 2014

(54) MAC-HS PROCESSING IN AN HSDPA-COMPATIBLE RECEIVER IN A 3G WIRELESS NETWORK

(75) Inventors: Rafael Carmon, Rishon le Zion (IL); Simon Issakov, Bethlehem, PA (US)

(73) Assignee: Agere Systems LLC, Allentown, PA (US)

(*) Notice: Subject to any disclaimer, the term of this patent is extended or adjusted under 35 U.S.C. 154(b) by 1225 days.

(21) Appl. No.: 12/161,762

(22) PCT Filed: Feb. 7, 2007

(86) PCT No.: PCT/US2007/061766
§ 371 (c)(1),
(2), (4) Date: Jul. 22, 2008

(87) PCT Pub. No.: WO2007/092887
PCT Pub. Date: Aug. 16, 2007

(65) Prior Publication Data
US 2010/0220638 A1 Sep. 2, 2010

Related U.S. Application Data

(60) Provisional application No. 60/771,553, filed on Feb. 8, 2006.

(51) Int. Cl.
*H04J 3/24* (2006.01)
*H04L 12/28* (2006.01)
*H04L 12/54* (2013.01)

(52) U.S. Cl.
USPC ........... 370/474; 370/394; 370/412; 370/414; 370/416; 370/418; 370/419; 370/420; 370/428; 370/429

(58) Field of Classification Search
None
See application file for complete search history.

(56) References Cited

U.S. PATENT DOCUMENTS 7,116,667 B2 * 10/2006 Jiang et al. ..................... 370/394
7,298,730 B2 * 11/2007 Wu ................................. 370/349

(Continued)

FOREIGN PATENT DOCUMENTS

EP 1 592 161 A 11/2005
JP 2006020133 A 1/2006

OTHER PUBLICATIONS

"UMTS Evolution to High Speed Downlink Packet Access," Douglas McCarthy, EETS 8316 Term Paper, Dec. 1, 2003, [retrieved on Feb. 2, 2007] Retrieved from the Internet: <URL: http://engr.smu.edu/~jseraj/2003_termpapers/Douglas%20Mc%20Carthy%20Term_Paper_HSDPA.doc>, pp. 1-13.

(Continued)

Primary Examiner — Faruk Hamza
Assistant Examiner — Diane Lo
(74) Attorney, Agent, or Firm — Mendelsohn, Drucker & Dunleavy, P.C.; Edward J. Meisarosh; Steve Mendelsohn

(57) ABSTRACT

In one embodiment, a method for processing a series of MAC-hs protocol data units (PDUs) in an HSDPA-compatible (high-speed downlink packet access) receiver in a 3G wireless communication network, the method including: (a) receiving a MAC-hs PDU having: (i) a queue identification (QID), (ii) a transmission sequence number (TSN), and (iii) one or more MAC-d PDUs, (b) then disassembling the MAC-hs PDU (c) then distributing the one or more MAC-d PDU to a reordering queue indicated by the QID, and (d) then performing reordering processing for the corresponding reordering queue based on the TSN. Steps (a) and (b) are performed in a physical layer of the receiver. Steps (c) and (d) are performed in a data-link layer of the receiver.

24 Claims, 8 Drawing Sheets

(56) References Cited

U.S. PATENT DOCUMENTS

| | | | |
|---|---|---|---|
| 7,444,169 B2* | 10/2008 | Ishii et al. | 455/561 |
| 7,535,886 B2* | 5/2009 | Lee et al. | 370/348 |
| 2001/0033582 A1* | 10/2001 | Sarkkinen et al. | 370/474 |
| 2002/0191544 A1* | 12/2002 | Cheng et al. | 370/236 |
| 2003/0210669 A1* | 11/2003 | Vayanos et al. | 370/335 |
| 2004/0114593 A1 | 6/2004 | Dick et al. | |
| 2004/0131186 A1* | 7/2004 | Kasuya et al. | 380/255 |
| 2005/0144339 A1 | 6/2005 | Wagh et al. | 710/36 |
| 2005/0174985 A1* | 8/2005 | Lee et al. | 370/349 |
| 2005/0180371 A1* | 8/2005 | Malkamaki | 370/342 |
| 2005/0243743 A1* | 11/2005 | Kimura | 370/278 |
| 2006/0002416 A1 | 1/2006 | Yagihashi | |
| 2006/0034175 A1* | 2/2006 | Herrmann | 370/236 |
| 2006/0056637 A1* | 3/2006 | Rezaiifar et al. | 380/274 |
| 2006/0234716 A1* | 10/2006 | Vesterinen et al. | 455/450 |
| 2007/0081612 A1 | 4/2007 | Chang et al. | 375/316 |

OTHER PUBLICATIONS

"3rd Generation Partnership Project; Technical Specification Group Radio Access Network; Medium Access Control (MAC) Protocol Specification (Release 5)," [retrieved on Feb. 2, 2007] Retrieved from the Internet: <URL: http://www.3gpp.org/ftp/Specs/html-info/25321.htm>, pp. 1-57.

"3rd Generation Partnership Project; Technical Specification Group Services and System Aspects; 3G Security; Security Architecture (Release 5)," [retrieved on Jan. 23, 2007] Retrieved from the Internet: <URL: http://http://www.3gpp.org/ftp/Specs/html-info/33102.htm>, pp. 1-61.

"3rd Generation Partnership Project; Technical Specification Group Radio Access Network; Multiplexing and channel coding (FDD) (Release 7)," 3GPP (3rd Generation Partnership Project) TS 25.212 V7.4.0 (Mar. 2007) Technical Specification, 3GPP Organisational Partners Publications, [Retreived on Apr. 9, 2007], Retrieved from the Internet: <URL: http://www.3gpp.org/ftp/Specs/html-info/25321.html> (100 pages).

"Integrated Circuits for 3GPP Mobile Wireless Systems," by Chris Nicol and Matthew Cooke, Bell Labratories, Lucent Technologies [Retrieved on Apr. 18, 2007], Retrievable from the Internet: <URL: http://www.ieexplore.ieee.org/ie15/7911/21814/01012850.pdf> 2001 (8 pages).

"Universal Mobile Telecommunications System (UMTS); Medium Access Control (MAC) protocol specification (3GPP TS 25.321 version 6.7.0 Release 6)"; ETSI TS 125 321, ETSI Standards, European Telecommunications Standards Institute, Sophia-Antipo, FR, vol. 3-R2, No. V6.7.0, Dec. 2005, pp. 1-94, XP014032593.

"Universal Mobile Telecommunications System (UMTS); 3G security; Security architecture (3GPP TS 33.102 version 7.0.0 Release 7)"; ETSI TS 133 102, ETSI Standards, European Telecommunications Standards Institute, Sophia-Antipo, FR, Dec. 2005, pp. 1-65, XP014032863.

Examiner's Office Letter; Mailed Feb. 13, 2012 for corresponding JP Application No. 2008-554484.

"3rd Generation Partnership Project; Technical Specification Group Radio Access Network; Medium Access Control (MAC) Protocol (Release 6)," 3GPP (3rd Generation Partnership Project) TS 25.321 V6.7.0 (Dec. 2005) Technical Specification.

Non-Final Office Action; Mailed May 12, 2012 for corresponding U.S. Appl. No. 11/755,999.

Notice of Preliminary Rejection; Mailed Apr. 29, 2013 for the corresponding Korean Application No. 10-2008-7021964.

* cited by examiner

400

500

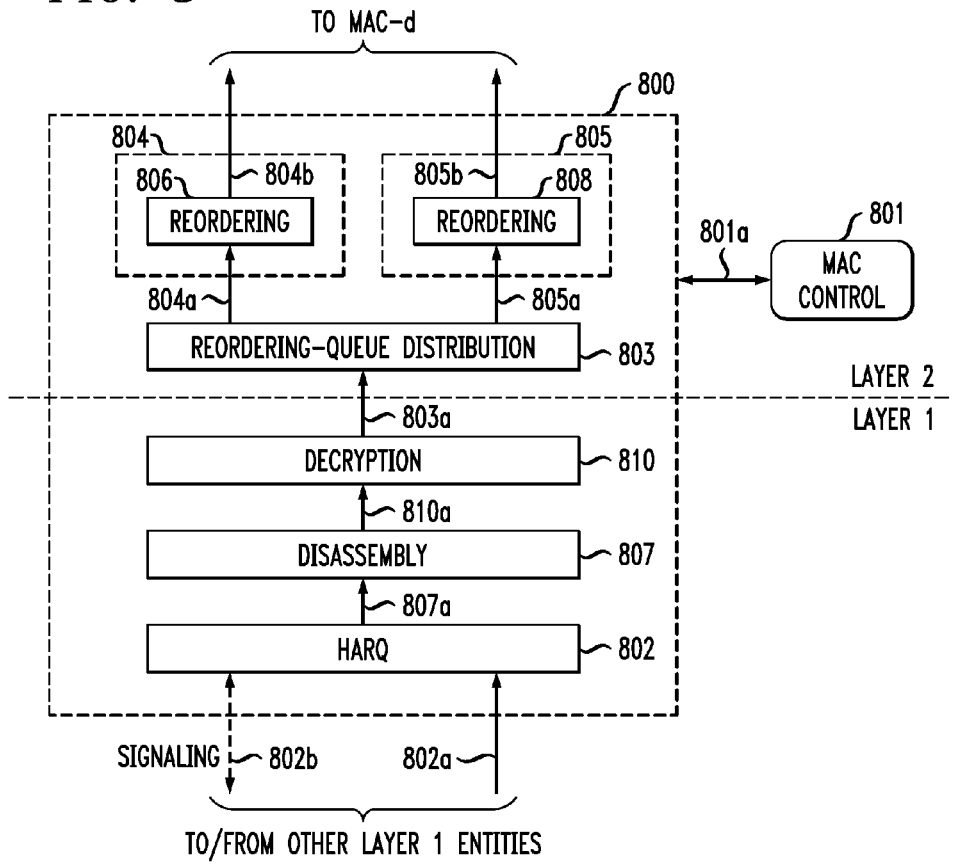

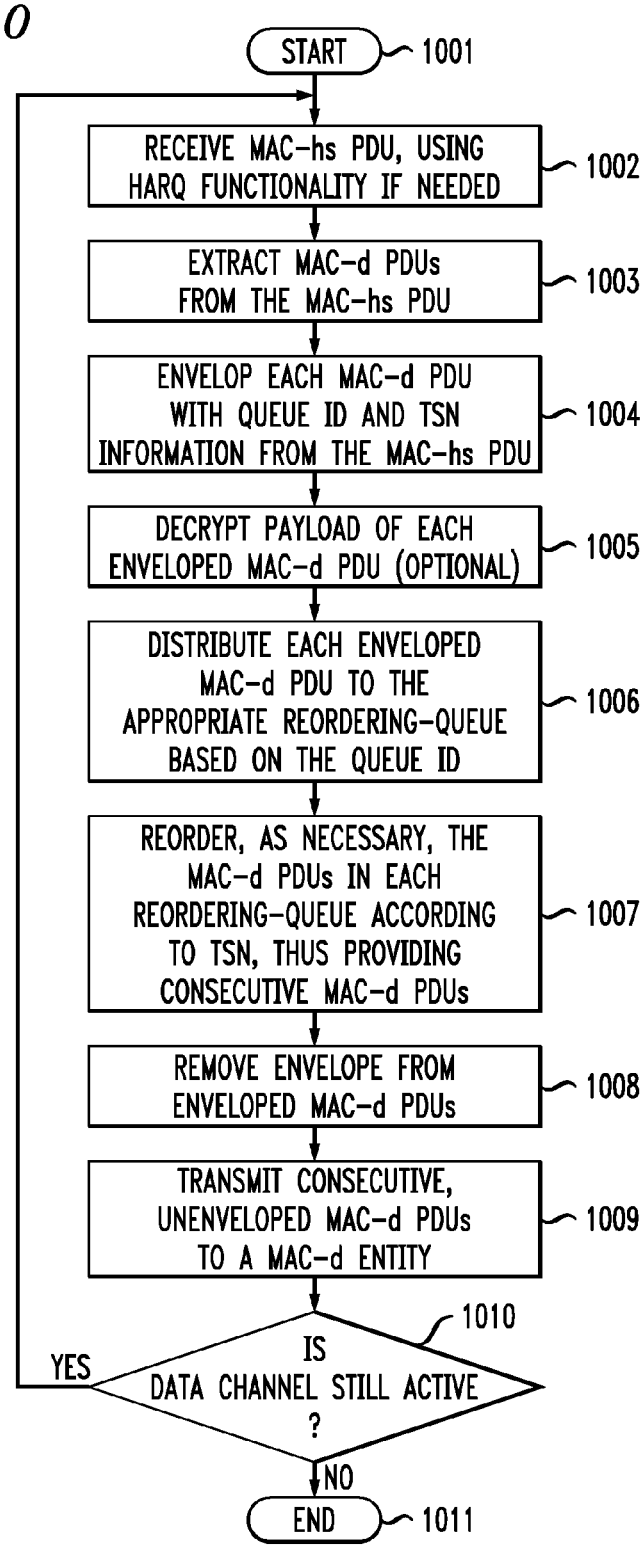

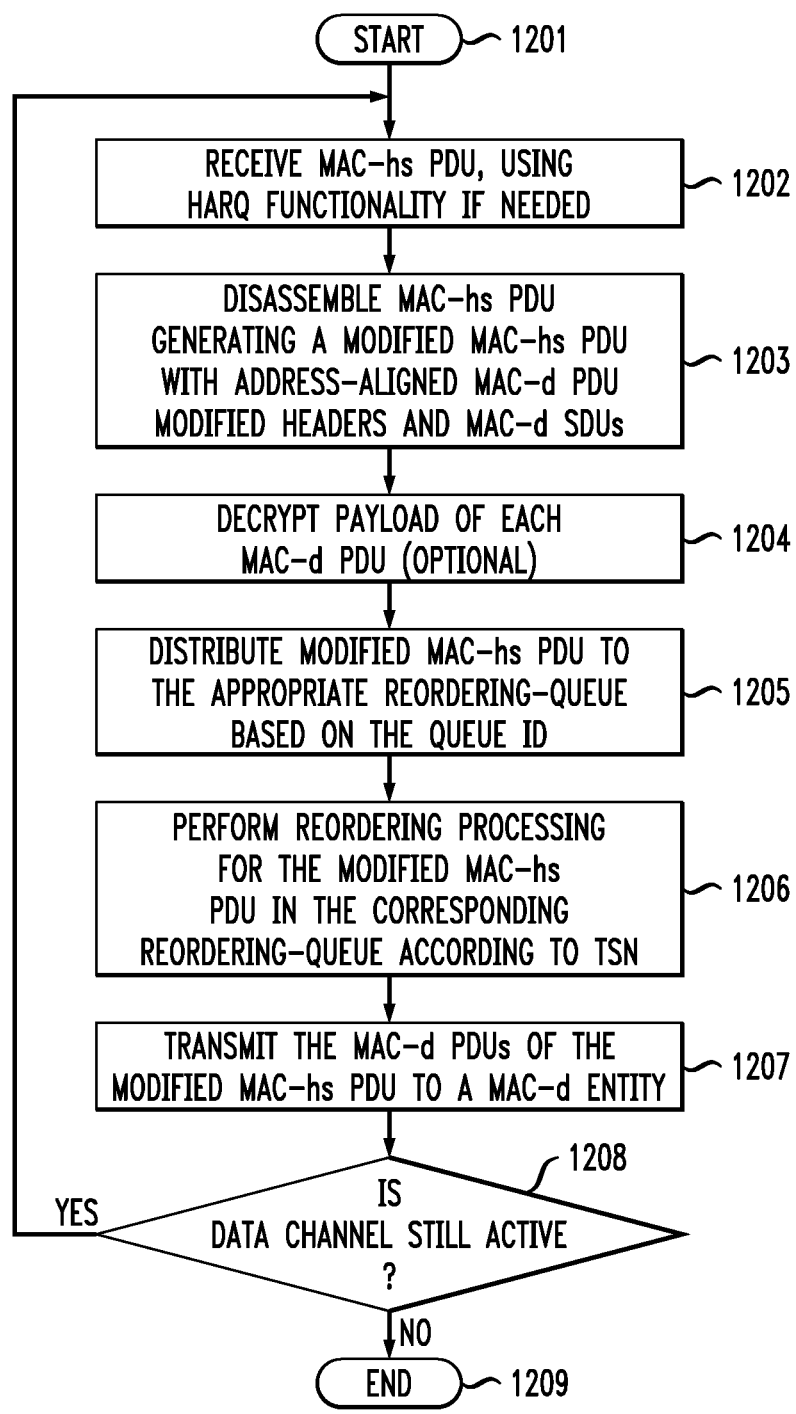

MAC-HS PROCESSING IN AN HSDPA-COMPATIBLE RECEIVER IN A 3G WIRELESS NETWORK

This application claims the benefit of the filing date of U.S. provisional application No. 60/771,553, filed on Feb. 8, 2006, the teachings of which are incorporated herein by reference.

BACKGROUND OF THE INVENTION

1. Field of the Invention

The present invention relates to wireless communication systems, and more particularly to transmission protocols used by third-generation (3G) wireless communication systems.

2. Description of the Related Art

One category of mobile telephony communication devices, or mobile phones, includes third-generation devices. Third-generation (3G) mobile phones use digital radio signals for communication with cell towers, also known as base stations. Third-generation mobile phones are able to simultaneously transfer multiple data streams, such as voice, e-mail, instant messages, and streaming audio or video. Third-generation mobile phones additionally allow for high rates of data transfers and broadband capabilities. The high rates of data transfer rely on efficient organization and transmission of data to and from the applications miming on a mobile phone. The organization and transmission of data is defined by protocols and standards.

Third-generation mobile phone standards are set by the Third Generation Partnership Project (3GPP) and are based on Universal Mobile Telecommunications System (UMTS) network technology. UMTS evolved from Global System for Mobile Communication (GSM) network technology, and UMTS can use GSM core networks. The 3GPP comprises several Technical Specification Groups (TSGs) that are responsible for various areas of third-generation technology. One way to categorize 3G technology is by layer levels and protocols. The 3G protocol stack includes at least three layers: (i) layer 1, also known as the physical layer, (ii) layer 2, also known as the data link layer, and (iii) layer 3, also known as the network layer. The network layer handles communication with applications on a mobile phone, the physical layer handles communication between the mobile phone and a base station, while the data link layer interfaces between the network and physical layers.

FIG. 1 shows a simplified partial block diagram of the 3G protocol stack. The various communication paths shown can be direct or indirect and can include intermediary elements which are not shown in the figure or described herein. Layer 1 comprises physical layer 101, which communicates with an antenna via path 101a and with layer 2 via path 102b. Path 102b comprises transport channels. Transport channels are data flows between the data link layer and the physical layer. Data in the transport channels is organized into packets. Transport channels can then be combined onto composite transport channels for radio transmission between a mobile phone and a base station using physical layer 101.

Layer 2 comprises Media Access Control (MAC) layer 102 and Radio Link Control (RLC) layer 103, which communicate via path 102a, wherein path 102a comprises logical channels. Logical channels are data flows within layer 2 associated with applications running on the mobile phone. The data flows are organized into packets in the logic channels. In a receiver, RLC layer 103 may contain a decryption entity (not shown) that functions to decrypt data that was encrypted by a corresponding encryption entity in a corresponding transmitter.

Layer 3 includes Radio Resource Controller (RRC) entity 104, which controls and communicates with physical layer 101, MAC layer 102, and RLC layer 103 via paths 104c, 104b, and 104d, respectively. RRC 104 communicates with applications running on the mobile phone via path 104a. RLC layer 103 can also communicate with applications running on the mobile phone via path 103a, either directly or through intermediary entities (not shown) in layer 3. Layer 3 includes other entities (not shown), as well.

Layer 2 architecture and design is regulated by Working Group 2 (WG2) of the Radio Access Network (RAN) TSG, which is in charge of the Radio Interface architecture and protocols (MAC, RLC, Packet Data Convergence Protocol (PDCP)), the specification of the Radio Resource Control protocol, the strategies of Radio Resource Management, and the services provided by the physical layer to the upper layers. Among the technical specifications (TS) provided by WG2 RAN TSG is TS 25.321, which is the MAC protocol specification. TS 25.321 is occasionally updated and multiple releases are published, in conjunction with new releases of the 3GPP standard. A list of releases of TS 25.321 is presently available on the Internet at http://www.3gpp.org/ftp/Specs/html-info/25321.htm. The MAC protocol specifies, among other things, (i) communication channels and (ii) protocol data units, formats, and parameters, for communication between the physical layer and the RLC layer of a mobile phone.

Release 5 of the 3GPP standard introduced the high-speed downlink packet access (HSDPA) protocol, which allows for the high-speed download of data to a mobile telephony device, referred to as user equipment (UE), from a base station, referred to as a Node-B. A Node-B is part of the UMTS Terrestrial Radio Access Network (UTRAN). Releases 6 and 7 of the 3GPP also include the HSDPA protocol, and later releases are expected to include it as well. Unless otherwise indicated, references herein to entities refer to logical entities in a UE.

The HSDPA protocol uses a High Speed Downlink Shared Channel (HS-DSCH), which is controlled by a MAC-layer entity called MAC-hs (MAC-high speed). A MAC-hs entity in a UE performs functions related to, but different from, the functions of a MAC-hs entity in a corresponding Node-B with which the UE is communicating over an HS-DSCH. An HS-DSCH might carry data for multiple UE processes. In order for the MAC-hs in the UE to deliver data packets to the appropriate UE process, the MAC-hs performs reordering-queue distribution, a function sometimes more-briefly referred to as queue distribution. Received MAC-hs packets include queue IDs which indicate the particular reordering queue to which the MAC-hs packets should be routed. The MAC-hs packets distributed to a particular reordering queue are then re-ordered, if necessary, and then disassembled. Packets may need to be re-ordered if they arrive out of order. Out-of-order arrival can result, for example, when a packet is not properly received and is re-transmitted after some sequentially-subsequent packets have already been successfully received. The UE's MAC-hs entity has a Hybrid Automatic Repeat Request (HARQ) entity, which functions as part of the error-control retransmission mechanism used for data packets that are not received as intended by the UE.

FIG. 2 shows the format of exemplary MAC-hs protocol data unit (PDU) 200 in accordance with the 3GPP standard. A MAC PDU in general is a bit string of variable length. MAC-hs PDU 200 comprises MAC-hs header 201 and MAC-hs payload 202 comprising one or more MAC-hs Service Data Units (SDUs), such as MAC-hs SDUs 203 and 204. MAC-hs payload 202 can also comprise optional padding. Both the MAC-hs header and the MAC-hs payload are of variable length, thus the MAC-hs SDU are generally not byte-, word-, or otherwise address-aligned. Each MAC-hs SDU, such as MAC-hs SDUs 203 and 204, corresponds to a MAC-d PDU. For example, MAC-hs SDU 203 may be equivalent to one MAC-d PDU and MAC-hs SDU 204 may be equivalent to another MAC-d PDU. Thus, MAC-hs payload 202 comprises one or more MAC-d PDUs.

MAC-hs header 201 comprises the queue ID and TSN fields discussed elsewhere herein. MAC-hs header 201 also comprises other fields required for MAC-hs headers by the 3GPP standard, such as a version flag (VF), size index identifier (SID), number of MAC-d PDUs (N), and field-following flag (F). A pair of SID and N parameters, such as $SID_1$ and $N_1$, are used to define the size, indicated by SID, of a quantity, indicated by N, of consecutive MAC-d PDUs (i.e., MAC-hs SDUs) in the MAC-hs payload. A field-following flag, such as $F_1$, is used to indicate whether more fields follow in the header or not. For example, if MAC-hs payload 202 comprises two MAC-d PDUs of a first size, followed by four MAC-d PDUs of a second size, followed by three MAC-d PDUs of the first size, then $SID_{1-3}$, $N_{1-3}$, and $F_{1-3}$ would be used to indicate that sequence. As an alternative example, if all the MAC-d PDUs in MAC-hs payload 202 are the same size, then only $SID_1$, $N_1$, and $F_1$ are necessary, and $SID_2$-$SID_k$, $N_2$-$N_k$, and $F_2$-$F_k$ can be omitted.

FIG. 3 shows a simplified block diagram of the architecture of UE-side MAC-hs entity 300 in accordance with Release 5 of the 3GPP standard. MAC-hs entity 300, which is located in MAC layer 102 of FIG. 1, receives downloaded data from layer 1 entities, processes it, and passes the processed downloaded data to a MAC-d entity (not shown) also located in MAC layer 102. MAC-hs entity 300 is controlled by MAC control entity 301 via path 301a. MAC-hs entity 300 communicates with the MAC-d entity via paths such as 304b and 305b, and communicates with layer 1 entities via paths 302a and 302b. MAC-hs entity 300 comprises HARQ entity 302, reordering-queue distribution entity 303, and one or more reordering queues, such as reordering queues 304 and 305. Reordering queue 304 comprises reordering entity 306 and disassembly entity 307, while reordering queue 305 comprises reordering entity 308 and disassembly entity 309. Each reordering queue in MAC-hs 300 corresponds to a particular process in the UE. There may be a limit on the number of queues a MAC-hs entity will handle. For example, in Release 5 of the 3GPP standard, the limit is eight queues.

HARQ entity 302 receives MAC-hs PDUs, downloaded from a corresponding Node-B, from layer 1 via path 302a. HARQ entity 302 communicates signaling information with the Node-B through layer 1 via bidirectional path 302b. If HARQ entity 302 determines that a MAC-hs PDU was successfully received, then HARQ entity 302 transmits an acknowledgment (ACK) in response. If HARQ entity 302 determines that a MAC-hs PDU was received with one or more errors that are not correctable, then HARQ entity 302 transmits a negative acknowledgement (NACK) in response to that PDU. If HARQ entity 302 transmits a NACK in response to a particular PDU, then HARQ entity 302 expects the corresponding Node-B to retransmit that particular PDU in response to the NACK. If a retransmitted PDU is received without error, then it can replace any previous error-ridden versions. If a retransmitted PDU is received with one or more errors, it might nevertheless be used, together with one or more previous error-ridden versions, to reconstruct an error-free version of that PDU. HARQ entity 302 passes received and/or reconstructed MAC-hs PDUs to reordering-queue distribution entity 303 via path 303a. Reordering-queue distribution entity 303 routes those MAC-hs PDUs to the correct reordering queue based on the queue IDs of those MAC-hs PDUs.

If, for example, the queue ID of a particular MAC-hs PDU indicates that the PDU belongs to queue 304, then that PDU is routed, via path 304a, to reordering entity 306 in queue 304. MAC-hs PDUs include a transmission sequence number (TSN), which indicates a PDU's location in a sequence of PDUs. Reordering entity 306 orders the received PDUs according to their TSNs. MAC-hs PDUs with consecutive TSNs are delivered to disassembly entity 307 upon receipt, but MAC-hs PDUs are not so delivered if MAC-hs PDUs with lower TSN numbers are missing. Such "early" MAC-hs PDUs, which are received while MAC-hs PDUs with a lower TSN are missing, are stored in a buffer until the missing MAC-hs PDUs are received, whereupon the consecutive MAC-hs PDUs are delivered to disassembly entity 307.

Disassembly entity 307, which receives ordered MAC-hs PDUs from reordering entity 306 via path 307a, is responsible for the disassembly of those MAC-hs PDUs. Disassembly involves the removal of the MAC-hs header and optional padding and the extraction of the MAC-d PDUs stored within each MAC-hs PDU. Disassembly typically requires many bit-shifting operations because the MAC-d PDUs inside a MAC-hs PDU are typically not byte-aligned, while extracted MAC-d PDUs typically need to be byte-aligned for proper addressing and handling by other entities. Disassembly entity 307 delivers the extracted MAC-d PDUs, via path 304b, to a MAC-d entity in the MAC layer of the UE.

If, for example, the queue ID of another MAC-hs PDU indicates that the PDU belongs to queue 305, then that PDU is routed, via path 305a, to reordering entity 308 in queue 305. Reordering entity 308 and disassembly entity 309 in reordering queue 305 operate in a similar way as described for reordering entity 306 and disassembly entity 307 of reordering queue 304, and so would reordering and disassembly entities in any additional reordering queues (not shown) in MAC-hs entity 300.

FIG. 4 shows a simplified block diagram of part of prior-art UE 400 showing processor relationship to protocol-stack layers. Different processors may be associated with different layers of the 3G protocol stack. For example, MAC-hs functionality is typically implemented in a Protocol Stack (PS) processor, such as PS processor 401. Thus, the tasks of PS processor 401 include HARQ, reordering-queue distribution, reordering, and disassembly. The reordering process, as noted above, utilizes a memory buffer for storing MAC-hs PDUs that arrive "too early." The 3GPP standard specifies that a particular memory buffer be shared by both (i) the MAC-hs reordering buffer and (ii) an RLC acknowledged mode (AM) transmitting and receiving buffer. PS processors, such as PS processor 401, are typically implemented using Advanced RISC (reduced instruction set computer) Machine (ARM) processors.

As noted above, the received data by may be encrypted and thus require decryption. Layer 2 decryption, such as RLC-layer and MAC-layer decryption, involves an algorithm called the f8 algorithm, and is also typically implemented in a PS processor. RLC-layer and MAC-layer ciphering is described in the 3GPP's TS 33.102 on security architecture, incorporated herein by reference in its entirety. Various releases of TS 33.102 are presently available on the Internet at http://www.3gpp.org/ftp/Specs/html-info/33102.htm. MAC-layer decryption is used for transparent RLC mode, while RLC-layer decryption is used for acknowledged and unacknowledged (AM and UM), i.e., non-transparent, RLC mode. Certain decryption tasks require use of particular parameters, such as radio bearer, hyperframe number (HFN), and cipher key, which become available in the RLC layer.

Layer 1 processor 402 is a baseband processor, which is a type of DSP, and is designed to efficiently handle bit-shifting and other bit-intensive operations. Layer 1 processor 402 performs baseband processing, which includes modem-like functionality for UE 400. In general, operations in layer 1 processor 402 are bit-oriented, while operations in PS processor 401 are byte- and word-, i.e., multi-byte memory unit, oriented.

SUMMARY OF THE INVENTION

In one embodiment, a method for processing a series of first-type protocol data units (PDUs) in a receiver in a communication network, the method comprising: (a) receiving a first-type PDU comprising: (i) a queue identification (QID); (ii) a transmission sequence number (TSN); and (iii) one or more second-type PDUs; (b) then disassembling the first-type PDU; (c) then distributing the one or more second-type PDUs to a reordering queue indicated by the QID; and (d) then performing reordering processing for the corresponding reordering queue based on the TSN.

In another embodiment, a receiver for a communication network, the receiver adapted to process a series of first-type protocol data units (PDUs), the receiver comprising: (a) a disassembly entity adapted to: (i) receive the series of first-type PDUs, wherein each first-type PDU comprises: (1) a queue identification (QID); (2) a transmission sequence number (TSN); and (3) one or more second-type PDUs; and (ii) then disassemble each first-type PDU; (b) a reordering-queue distribution entity adapted to distribute the one or more second-type PDUs to a reordering queue indicated by the QID; and (c) one or more reordering entities, each adapted to perform reordering processing for the corresponding reordering queue based on the TSN.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 8 shows a simplified block diagram of a modified MAC-hs entity, in accordance with another embodiment of the present invention.

FIG. 9 shows an empty sample reference table of decryption parameters for use by a decryption entity.

FIG. 10 shows a sample flow chart of an exemplary method of operation of a MAC-hs entity of FIG. 8.

FIG. 12 shows a sample flow chart of an exemplary method of operation of an alternative implementation of a MAC-hs entity of FIG. 8.

DETAILED DESCRIPTION

In assigning tasks to processors in multi-processor systems, system designers generally prefer to assign the performance of bit-shifting operations, such as those that might be required by disassembling MAC-hs PDUs, to processors with high MIPS (millions of instructions per second) ratings, since those processors are likely to perform those operations efficiently. Disassembly might require a vast number of bit manipulations and might create a processing bottleneck for a PS (protocol stack) processor, especially with the high data rates possible using the HSDPA protocol. The operation of a UE (user equipment) might be more efficient if the disassembly functions of the UE were performed by a layer 1 processor rather than a PS processor. Similarly, since decryption may require multiple bit-manipulating operations, it might be more efficient to perform decryption in the baseband processor than in the PS processor.

A further reason for shifting certain operations from the PS processor to the baseband processor is due to the shorter Transmission Time Interval (TTI) used in HSDPA mode. TTI refers to the duration, typically in milliseconds, of an independently-decodable radio transmission, and is one representation of a transport block. The TTI for HSDPA operation can be a mere 2 msec. The short duration of the TTI ensures that the channel conditions are likely to remain substantially fixed during a single TTI. However, the short duration might be demanding on the User Equipment (UE) because the UE might need to process a whole MAC-hs PDU in less than 2 msec. Specifically, the UE might need to disassemble and decrypt a PDU, as well as perform additional, less-bit-intensive operations, all in less than 2 milliseconds.

Analysis of the generic MAC-hs entity shows that the processes of disassembly and reordering are reversible in order. Thus, it is possible to perform the reordering algorithm for the MAC-hs PDUs in the PS processor, and perform disassembly, which involves bit-manipulation and byte-alignment, in hardware before the reordering. Specifically, the physical-layer baseband processor can decode the MAC-hs headers, and organize the MAC-hs SDUs, i.e., MAC-d PDUs, in a buffer so as to reduces, or even eliminate, the need for bit-shifting and byte-alignment in the UE's MAC-d entity and RLC layer. This restructuring reduces the number of bit-shifting operations performed by the PS processor, potentially to zero, because the reordering the PS processor performs involves handling of MAC-hs SDU pointers, rather than handling MAC-hs SDU bit data. In addition, the MAC-hs SDU reordering uses a buffer in the RLC-layer to temporarily store MAC-hs SDUs. Thus, there is no need to allocate a buffer in the baseband processor for the reordering function.

Figure 4:
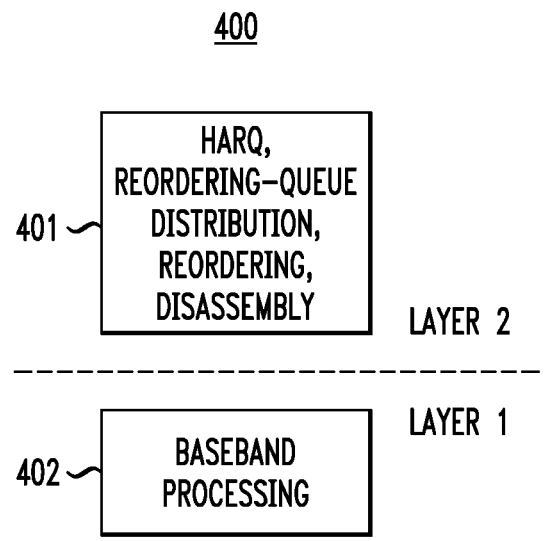
FIG. 4 shows a simplified block diagram of part of a prior-art UE showing processor relationship to protocol-stack layers.
Figure 5:
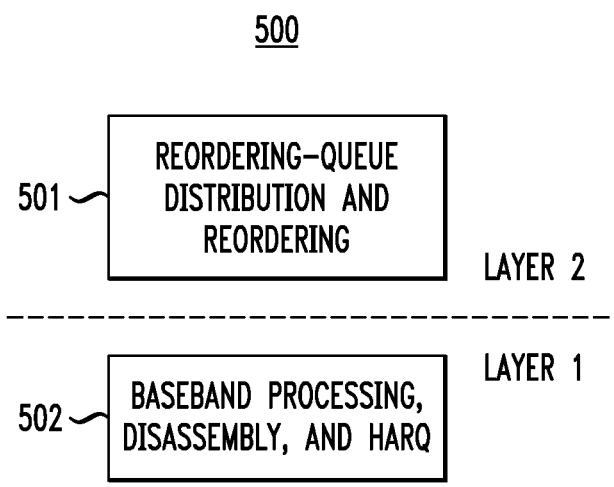
FIG. 5 shows a simplified block diagram of part of a UE, in accordance with an embodiment of the present invention.

FIG. 5 shows a simplified block diagram of part of UE 500, in accordance with an embodiment of the present invention, showing processor relationship to protocol-stack layers. UE 500 performs the MAC-hs functions in a different way from UE 400 of FIG. 4. UE 500 comprises PS processor 501, which operates as part of layer 2, and baseband processor 502, which operates as part of layer 1. PS processor 501 performs reordering-queue distribution and reordering functions, while baseband processor 502 performs disassembly and HARQ functions, as well as baseband processing. In another embodiment (not shown), baseband processor 502 also performs decryption functions, wherein baseband processor 502 downloads encrypted data, receives parameters needed for decryption from PS processor 501, performs decryption, and provides decrypted data to PS processor 501 for further handling. In an alternative embodiment, baseband processor 502 itself extracts all the needed decryption parameters. The functions of some MAC-hs elements in UE 500 are modified from the standard functions of those elements in a standard MAC-hs entity in order to accommodate the rearrangement of those entities in UE 500.

Figure 6:
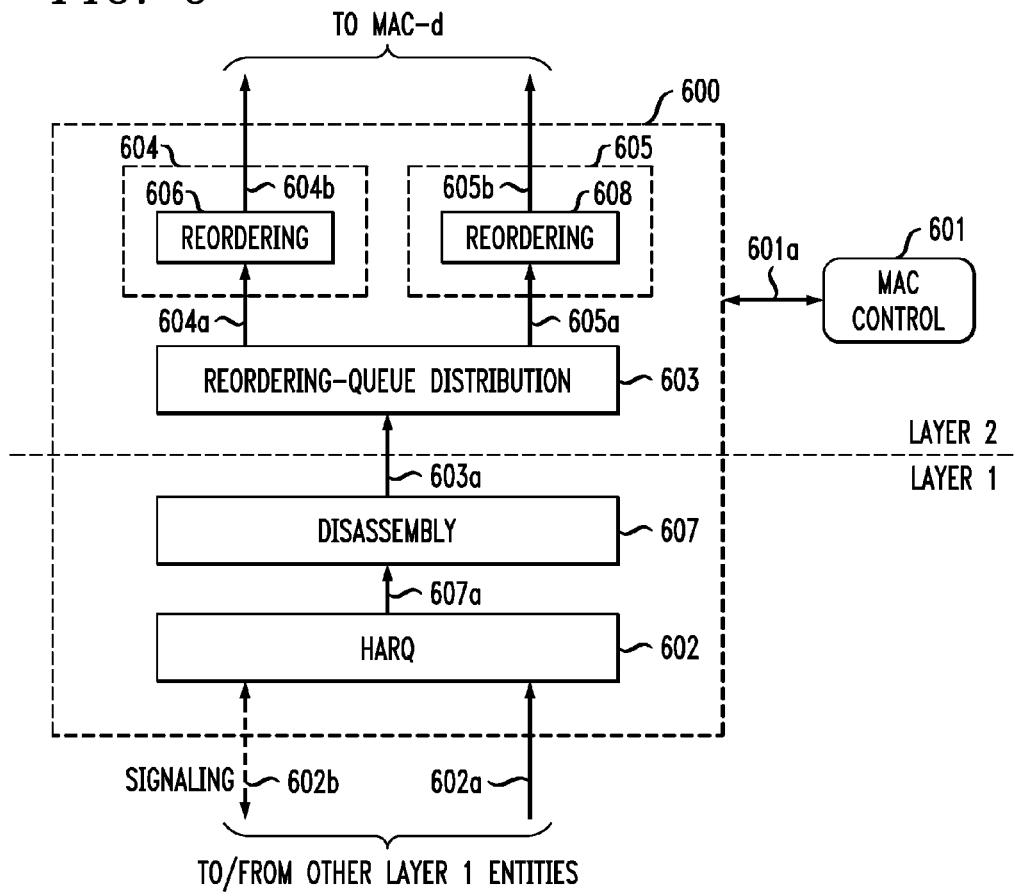
FIG. 6 shows a simplified block diagram of the architecture of a modified MAC-hs entity, in accordance with an embodiment of the present invention.

FIG. 6 shows a simplified block diagram of the architecture of modified MAC-hs entity 600, in accordance with an embodiment of the present invention. Elements in FIG. 6 that are similar in name, function, and/or operation to elements in FIG. 3 have been similarly labeled, but with a different prefix. MAC-hs entity 600 extends into both layer 1 and layer 2. The operation of MAC-hs entity 600 is controlled by MAC control entity 601 via path 601*a*. MAC-hs entity 600 comprises, in layer 1, HARQ entity 602 and disassembly entity 607. MAC-hs entity 600 further comprises, in layer 2, reordering-queue distribution entity 603 and one or more reordering queues such as reordering queues 604 and 605. Reordering queue 604 comprises reordering entity 606, while reordering queue 605 comprises reordering entity 608.

Figure 1:
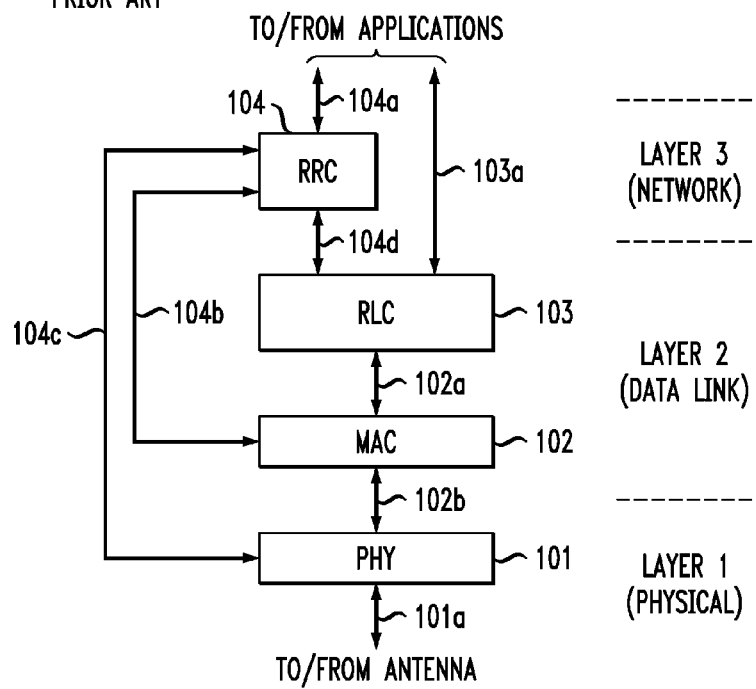
FIG. 1 shows a simplified partial block diagram of the 3G protocol stack.
Figure 2:
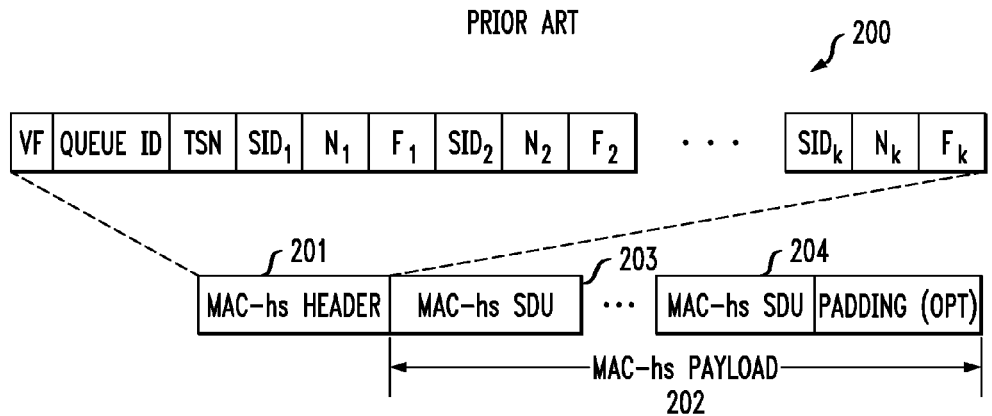
FIG. 2 shows the format of an exemplary MAC-hs PDU in accordance with the 3GPP standard.
Figure 3:
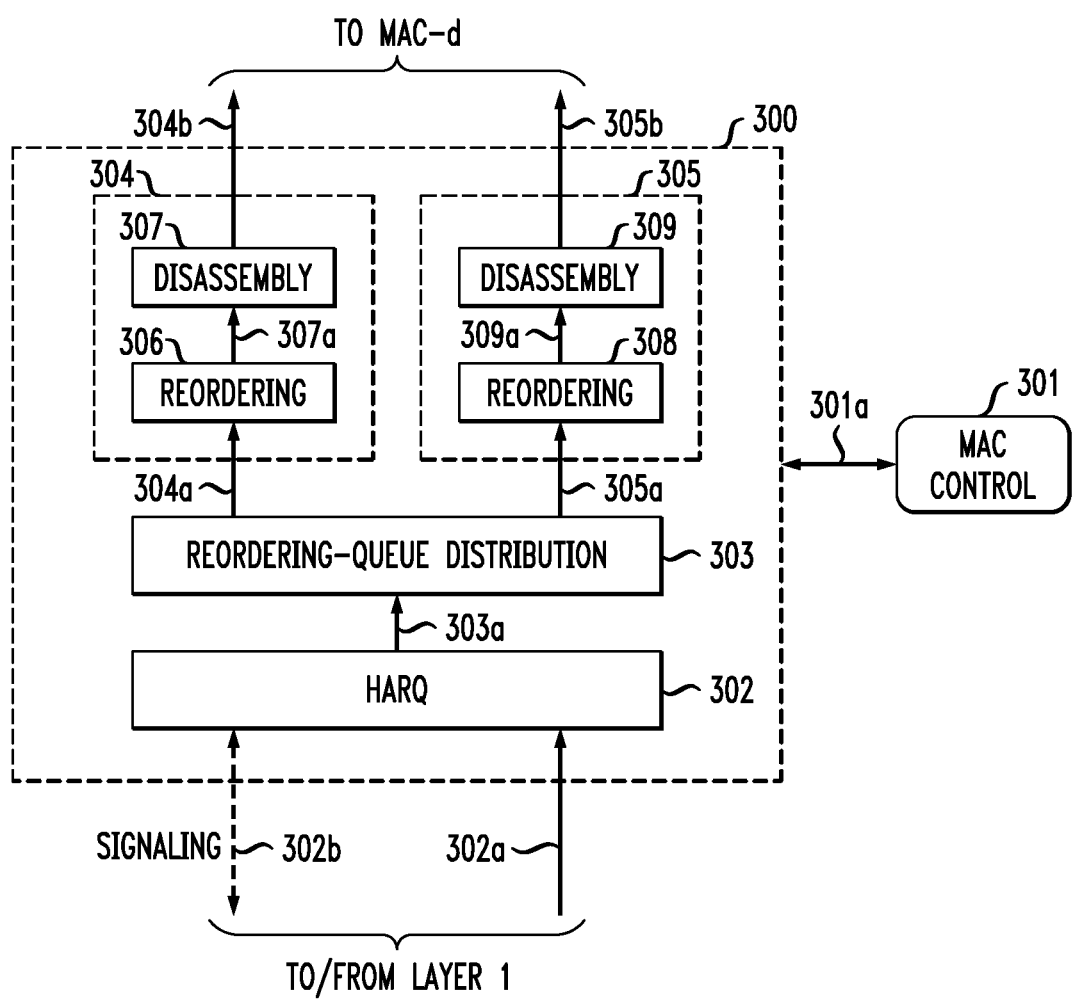
FIG. 3 shows a simplified block diagram of the architecture of a UE-side MAC-hs entity in accordance with Release 5 of the 3GPP standard.

HARQ entity 602 functions similarly to HARQ entity 302 of FIG. 3. HARQ entity 602 communicates with other layer 1 entities via paths 602*a* and 602*b*, and passes received and/or reconstructed MAC-hs PDUs to disassembly entity 607 via path 607*a*. Depending on the particular implementation, disassembly entity 607 can perform disassembly functions similar to disassembly entities 307 and 309, can perform additional functions, and/or can function differently. In one implementation, disassembly entity 607 removes the MAC-hs header and extracts the MAC-d PDUs from a received MAC-hs PDU. Since reordering-queue distribution entity 603 needs to access the queue ID of a PDU and re-ordering entities 606 and 608 need to access the TSN of a PDU, disassembly entity 607 provides that information. Disassembly entity 607 adds a header to each extracted MAC-d PDU wherein the header includes the queue ID and TSN for the MAC-hs PDU from which that MAC-d PDU was extracted. Disassembly entity 607 then transmits enveloped MAC-d PDUs, with added headers as described, to reordering-queue distribution entity 603 via path 603*a*.

Reordering-queue distribution entity 603 receives the enveloped MAC-d PDUs and routes them to the appropriate reordering queue based on the queue IDs associated with those MAC-d PDUs, i.e., the queue IDs in the header added to each enveloped MAC-d PDU by disassembly entity 607. If, for example, the queue ID of a particular enveloped MAC-d PDU indicates that the PDU belongs to queue 604, then that PDU is routed, via path 604*a*, to reordering entity 606 in queue 604. Reordering entity 606 then orders the received PDUs according to their TSNs, which are indicated in the added header. MAC-d PDUs in queue 604 with consecutive PDUs are transmitted via path 604*b* upon receipt, but MAC-d PDUs are not delivered if MAC-d PDUs with lower TSN numbers are missing. Reordering entity 606 transmits, via path 604*b*, the MAC-d PDUs, without the headers added by disassembly entity 607, to a MAC-d entity in the MAC layer of the UE.

If, for example, the queue ID of a particular enveloped MAC-d PDU indicates that the PDU belongs to queue 605, then that PDU is routed, via path 605*a*, to reordering entity 608 in queue 604. Reordering entity 608 in reordering queue 605 operates in a similar way as described for reordering entity 606 of reordering queue 604, and so would reordering entities in any additional reordering queues (not shown) in MAC-hs entity 600.

In an alternative embodiment, reordering-queue distribution entity 603 also modifies the added header by either deleting or moving the queue ID in the added header. Reordering entity 606 then retrieves the TSN from the modified added header, and processes as above. Reordering entity 608 in queue 605 operates in a similar way as described for reordering entity 606, and so would reordering entities in any additional reordering queues (not shown) in MAC-hs entity 600.

Figure 7:
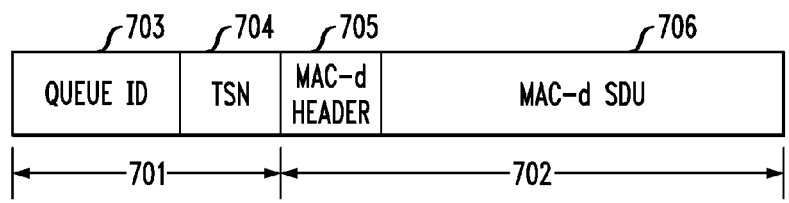
FIG. 7 shows the format of an exemplary enveloped MAC-d PDU in accordance with an embodiment of the present invention.

FIG. 7 shows the format of exemplary enveloped MAC-d PDU 700 in accordance with an embodiment of the present invention. Enveloped MAC-d PDU 700 comprises added header 701 and payload 702. Added header 701 comprises queue ID field 703 and TSN field 704. Payload 702 comprises a MAC-d PDU. MAC-d PDU 702 comprises MAC-d header 705 and payload 706, which is a MAC-d Service Data Unit (SDU) of variable length. Since the 3GPP standard specifies that the queue ID is a 3-bit field, and the TSN is a 6-bit field, in one implementation 23 padding bits (not shown) are added to the header so that the header is 32 bits in size, and the payload, i.e., MAC-d PDU 702, will be address-aligned.

In another implementation, wherein MAC-d header 705 is y bits long and less than or equal to 23 bits, 32−(9+y) padding bits (not shown) are added to the header so that added header 701 and MAC-d header 705 together add up to 32 bits and thus, MAC-d SDU 706 will be address-aligned. For example, if MAC-d header 705 is 4 bits long, 19 padding bits will be added. In an alternative embodiment, the padding bits are partly or wholly replaced by informative fields indicating, for example, the sequential order of the MAC-d PDU within the MAC-hs PDU and/or its SID. Such information can also be preserved and transmitted via multiple other means, as would be appreciated by one of ordinary skill in the art.

In an alternative embodiment, disassembly entity 607 adds the appropriate queue ID and TSN information to the end of each MAC-d PDU, as a footer rather than as a header. In another alternative embodiment, disassembly entity 607 adds both a header and a footer to an extracted MAC-d PDU to transmit queue ID and TSN information. In yet another alternative embodiment, disassembly entity 607 transmits unenveloped extracted MAC-d PDU to reordering-queue distribution entity 603, and separately works to create a data structure correlating each transmitted MAC-d PDU, or its memory address, to a queue ID and a TSN, for use by (i) reordering-queue distribution entity 603 for routing MAC-d PDUs to the appropriate queue and (ii) reordering entities such as 606 and 608 for reordering, if necessary, the MAC-d PDUs they receive. Various additional means for conveying queue ID and TSN information to reordering-queue distribution entity 603 and reordering entities 606 and 608 are available, as would be appreciated by a person of ordinary skill in the art. For example, queue ID and TSN information can be transmitted to reordering-queue distribution entity 603 and reordering entities 606 and 608 using out-of-band communication paths.

FIG. 8 shows a simplified block diagram of modified MAC-hs entity 800, in accordance with another embodiment of the present invention. Elements in FIG. 8 that are similar in name, function, and/or operation to elements in FIG. 6 have been similarly labeled, but with a different prefix. MAC-hs entity 800 is controlled by MAC control entity 801 via path 801*a*. MAC-hs entity 800 operates substantially similarly to MAC-hs entity 600 of FIG. 6, but with the addition of decryption entity 810 located in layer 1. Decryption entity 810 receives MAC-d PDUs from disassembly entity 807 via path 810a. The received MAC-d PDU might be enveloped or not, depending on the particular implementation, as described above. Decryption entity 810 performs a decryption operation on the received MAC-d PDUs and transmits the decrypted MAC-d PDUs to reordering-queue distribution entity 803 via path 803a for processing similar to that described above in reference to FIG. 6. Decryption entity 810 uses the f8 algorithm of the 3GPP standard to decrypt data. Decryption entity 810 might require certain parameters, described above, from the MAC layer and RLC layer.

FIG. 9 shows empty sample reference table 900 of decryption parameters for use by decryption entity 810. Table 900 is structured so that it provides the radio bearer, RLC mode, cipher key, and RLC HFN parameters for a given download (DL) HS-DSCH transport channel identity. The DL HS-DSCH transport channel is identified by the queue ID and C/T field of a particular MAC-d PDU. The queue ID, as explained above, is obtained from the header of the MAC-hs PDU which contains the MAC-d PDU. The C/T field, which identifies a logical channel, is found in the header section of the particular MAC-d PDU. The table fields are populated and updated by appropriate entities in the MAC layer and/or RLC layer, as would be appreciated by one of ordinary skill in the art. For each extracted MAC-d PDU, decryption entity 810 identifies the corresponding queue ID and C/T parameters, and uses them as a pointer to table 900 to get the required parameters to decrypt the particular MAC-d PDU.

In one embodiment, if an appropriate entity in the RLC layer determines that the values of the table were not correct when used by decryption entity 810, which is located in layer 1, then RLC entities can avoid passing the deciphered data provided by decryption entity 810 and an RLC decryption entity (not shown) that is located in layer 2 can use software decryption in order to decrypt data correctly. An appropriate RLC entity can use the incorrect table values that were used by decryption entity 810 to recreate the original encrypted data, and then use the correct parameters to correctly decrypt the MAC-d PDUs. If both encryption and decryption are simply a XOR operation of (i) the data and (ii) a key stream based on the parameters, then re-generating the original un-decrypted data is trivial, as would be appreciated by one of ordinary skill in the art. In an alternative embodiment, un-decrypted MAC-d PDUs are stored in a memory buffer until after an appropriate RLC-layer entity determines they are no longer needed.

FIG. 10 shows sample flow chart 1000 of an exemplary method of operation of MAC-hs entity 800 of FIG. 8. Following the start of the method (step 1001), a data session is active and MAC-hs entity 800 receives a MAC-hs PDU, and if necessary, performs HARQ functionality as described above (step 1002). The MAC-hs PDU is disassembled, wherein one or more MAC-d PDUs are extracted from the MAC-hs PDU (step 1003). Each MAC-d PDU is provided with an envelope providing the queue ID and TSN information from the MAC-hs PDU header (step 1004). If the payload of the MAC-d PDU has been encrypted using the f8, or similar, algorithm, then the payload is decrypted, and the decrypted payloads are used (step 1005).

Each enveloped MAC-d PDU is distributed to the appropriate reordering-queue based on the queue ID of the PDU (step 1006). The MAC-d PDUs in each reordering-queue are reordered, as necessary, according to the TSNs of the PDUs, thereby providing consecutive MAC-d PDUs (step 1007). The envelope is removed from the MAC-d PDUs (step 1008). The consecutive, un-enveloped MAC-d PDUs are then transmitted to a MAC-d entity (step 1009). If the data channel is still active (step 1010), then the process returns to step 1002 to receive the next MAC-hs PDU; otherwise, the process terminates with step 1011.

In an alternative embodiment, step 1008 comprises modifying the MAC-d headers so that the MAC-d payloads, each comprising a MAC-d SDU, are address-aligned. Thus, step 1009 comprises transmitting modified MAC-d PDUs to the MAC-d entity.

In alternative implementations of disassembly entities such as disassembly entities 607 and 807 of FIGS. 6 and 8, respectively, the disassembly entity outputs a modified MAC-hs PDU rather than MAC-d PDUs. In the modified MAC-hs PDU, the constituent MAC-d PDU headers and payloads are address-aligned for easier access by other MAC-layer entities. Outputting a modified MAC-hs PDU rather than individual MAC-d PDUs allows for more efficient reordering-queue distribution and reordering since, for each received MAC-hs PDU, those functions are performed on one modified MAC-hs PDU rather than multiple MAC-d PDUs that share the same Queue ID and TSN. Subsequently, reordering-queue distribution entities such as reordering-queue distribution entities 603 and 803 of FIGS. 6 and 8, respectively, operate on modified MAC-hs PDUs rather than MAC-d PDUs. Similarly, reordering entities, such as reordering entities 606 and 608 of FIGS. 6 and 806 and 808 of FIG. 8, also operate on modified MAC-hs PDUs rather than MAC-d PDUs.

Figure 11:
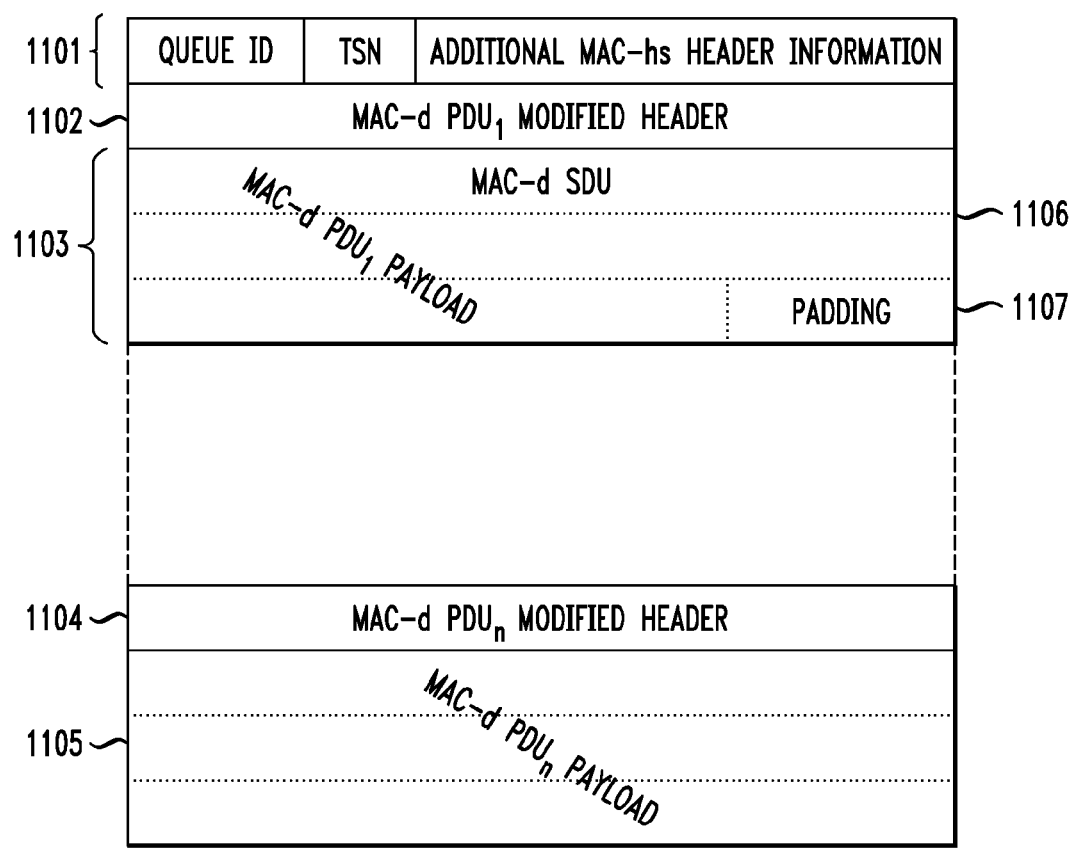
FIG. 11 shows a memory-storage representation of an exemplary modified MAC-hs PDU in accordance with an embodiment of the present invention.

FIG. 11 shows a memory-storage representation of exemplary modified MAC-hs PDU 1100 in accordance with an embodiment of the present invention. Address-alignment is represented by alignment with the left edge of modified MAC-hs PDU 1100. The width of the memory-storage representation of modified MAC-hs PDU 1100 is equivalent to 32 bits, and the height depends on the number and size of constituent MAC-d PDUs within modified MAC-hs PDU 1100. Modified MAC-hs PDU 1100 comprises address-aligned modified MAC-hs header 1101, which in turn comprises the queue ID and TSN, additional MAC-hs header info, and/or padding. Modified MAC-hs PDU 1100 further comprises n address-aligned MAC-d modified headers and MAC-d payloads. Each address-aligned MAC-d modified header, such as MAC-d $PDU_1$ modified header 1102 and MAC-d $PDU_n$ modified header 1104, comprises logical channel identification, SID, additional header information, and/or padding bits. Each of the n address-aligned MAC-d payloads, such as MAC-d $PDU_1$ payload 1103 and MAC-d $PDU_n$ payload 1105, comprises an address-aligned MAC-d SDU. For example, MAC-d $PDU_1$ payload 1103 comprises 90-bit MAC-d SDU 1106 and 6-bit padding 1107, for a total of 96 bits, or 3 32-bit memory units.

FIG. 12 shows sample flow chart 1200 of an exemplary method of operation of an alternative implementation of MAC-hs entity 800 of FIG. 8. Following the start of the method (step 1201), a data session is active and MAC-hs entity 800 receives a MAC-hs PDU, and if necessary, performs HARQ functionality as described above (step 1202). The MAC-hs PDU is disassembled, wherein a modified MAC-hs PDU, such as MAC-hs PDU 1100 of FIG. 11, is generated with address-aligned MAC-d PDU modified headers and MAC-d SDUs (step 1203). The disassembly and address-alignment can involve numerous bit-shifting operations. If one or more MAC-d SDUs have been encrypted using the f8, or similar, algorithm, then those MAC-d SDUs are decrypted inside the modified MAC-hs PDU (step 1204). The modified MAC-hs PDU is then stored in a memory in a PS processor, such as PS processor 501 of FIG. 5, for ease-of-use by entities implemented in the PS processor (not shown).

The modified MAC-hs PDU is distributed to the appropriate reordering-queue, as indicated by the Queue ID (step 1205). Reordering processing, including reordering, if necessary, as indicated by the TSN, is performed on the modified MAC-hs PDU in the corresponding reordering-queue (step 1206). Following reordering processing, the constituent MAC-d PDUs of the MAC-hs PDU are transmitted to a MAC-d entity for further processing (step 1207). If the data channel is still active (step 1208), then the process returns to step 1202 to receive the next MAC-hs PDU; otherwise, the process terminates with step 1209.

An exemplary embodiment has been described using one encryption/decryption algorithm. However, alternative implementations utilize other encryption/decryption algorithms, with corresponding adjustments to the details of implementation, as would be appreciated by one of ordinary skill in the art.

Exemplary embodiments have been described using TS 25.321 terms and Release 5 of the 3GPP standard. However, the invention is not limited to TS 25.321, Release 5, or 3GPP implementations. The invention is applicable to any suitable communication standard that is adapted, as part of data transmission, to disassemble and reorder received data packets. The invention is also applicable to such suitable communication standards that are also adapted to decrypt the received data packets.

Exemplary embodiments have been described wherein particular entities perform particular functions. However, the particular functions may be performed by any suitable entity and are not restricted to being performed by the particular entities named in the exemplary embodiments.

Exemplary embodiments have been described with data flows between entities in particular directions. Such data flows do not preclude data flows in the reverse direction on the same path or on alternative paths that have not been shown or described. Paths that have been described as bidirectional do not necessarily pass data in both directions.

As used herein, the term "mobile phones" refers generically to mobile wireless telephony communication devices, and includes mobile communication devices that function as telephones, as well as mobile communication devices that do not necessarily function as telephones, e.g., a mobile device that transmits instant messages and downloads streaming audio, but is not adapted to be held up to a user's head for telephonic conversation.

As used herein, the term "buffer" and its variants refer to a dynamic computer memory that is preferably adapted to have its present contents repeatedly overwritten with new data. To buffer particular data, an entity can have a copy of that data stored in a determined location, or the entity can be made aware of the memory location where a copy of that data is already stored.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Memory is typically divided into byte, word, or other multi-byte segments, and addressed accordingly. As used herein, the terms "byte-aligned," "word-aligned," "address-aligned," and their variants refer to the alignment of a data structure (e.g., a PDU) in memory with a memory address.

As used herein in reference to data transfers between entities in the same device, and unless otherwise specified, the terms "receive" and its variants can refer to receipt of the actual data, or the receipt of one or more pointers to the actual data, wherein the receiving entity can access the actual data using the one or more pointers.

As used herein in reference to data structures, such as MAC PDUs and their components, the term "modified" and its variants indicate that, in a particular embodiment, the particular data structure may be modified from the 3GPP standard form for that particular data structure in that context in order to achieve some purpose, such as address alignment, but does not necessarily require a particular transformation.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. A method for processing a series of first-type protocol data units (PDUs) in a receiver in a communication network, the method comprising:
   (a) receiving a first-type PDU comprising:
      (i) a queue identification (QID);
      (ii) a transmission sequence number (TSN); and
      (iii) one or more second-type PDUs;
   (b) then disassembling the first-type PDU;
   (c) then distributing the one or more second-type PDUs to a reordering queue indicated by the QID; and
   (d) then performing reordering processing for the corresponding reordering queue based on the TSN, wherein:
      the receiver has a protocol stack comprising a physical layer and a data-link layer; and
      steps (a) and (b) are performed in the physical layer.

2. The method of claim 1, wherein the communication network is a wireless communication network.

3. The method of claim 2, wherein the first- and second-type PDUs are based on a Third-Generation Partnership Project (3GPP) wireless standard.

4. The method of claim 3, wherein each first-type PDU is based on a MAC-hs PDU of the 3GPP wireless standard and each second-type PDU is based on a MAC-d PDU of the 3GPP wireless standard.

5. The method of claim 3, wherein the receiver is part of a user equipment (UE) compatible with the 3GPP wireless standard.

6. The method of claim 3, wherein the receiver is compatible with a high-speed downlink packet access (HSDPA) protocol of the 3GPP wireless standard.

7. The method of claim 3, further comprising, after step (d):
(e) then providing the one or more second-type PDUs to a MAC-d entity in the receiver.

8. The method of claim 1, wherein steps (c) and (d) are performed in the data-link layer.

9. The method of claim 8, wherein the first-type PDU is received from a Hybrid Automatic Repeat Request (HARM) entity located in the physical layer.

10. The method of claim 8, wherein:
steps (a) and (b) are performed by a baseband integrated circuit (IC) adapted to implement the physical layer of the receiver; and
steps (c) and (d) are performed by an Advanced RISC Machine (ARM) processor adapted to implement the data-link layer of the receiver.

11. The method of claim 1, wherein:
step (b) further comprises enveloping each second-type PDU in a corresponding envelope comprising the QID and the TSN;
step (c) comprises distributing each second-type PDU to the reordering queue indicated by the QID in the corresponding envelope; and
step (d) comprises performing reordering processing for each second-type PDU based on the TSN in the corresponding envelope.

12. The method of claim 11, wherein:
each second-type PDU comprises a second-type header and a second-type service data unit (SDU); and
step (b) further comprises adding one or more padding bits to the enveloped second-type PDU to ensure address alignment.

13. The method of claim 1, further comprising, after step (b) and before step (c), decrypting an encrypted payload of at least one second-type PDU.

14. The method of claim 13, wherein:
the receiver has a protocol stack comprising a physical layer and a data-link layer; and
the decrypting is performed in the physical layer.

15. The method of claim 14, further comprising receiving from the data-link layer one or more parameters for the decrypting.

16. The method of claim 1, wherein:
the communication network is a wireless communication network;
the first-type PDU is a based on a MAC-hs PDU of a 3GPP wireless standard and the second-type PDU is based on a MAC-d PDU of the 3GPP wireless standard;
the receiver is part of a user equipment (UE) compatible with the 3GPP wireless standard;
the receiver is compatible with a high-speed downlink packet access (HSDPA) protocol of the 3GPP wireless standard;
the first-type PDU is received from a Hybrid Automatic Repeat Request (HARM) entity located in the physical layer; and
steps (c) and (d) are performed in the data link layer.

17. The method of claim 16, further comprising:
after step (b), decrypting an encrypted payload of at least one second-type PDU, wherein the decrypting is performed in the physical layer; and
receiving from the data-link layer one or more parameters for the decrypting.

18. The method of claim 1, wherein:
each second-type PDU comprises:
a second-type header; and
a second-type service data unit (SDU);
step (b) comprises address-aligning the one or more constituent second-type SDUs from the first-type PDU to generate a modified first-type PDU; and
steps (c) and (d) are performed on the modified first-type PDU that comprises the one or more second-type PDUs.

19. The method of claim 18, further comprising, after step (d), then providing the one or more address-aligned second-type SDUs to a MAC-d entity in the receiver.

20. The method of claim 18, wherein step (b) further comprises address-aligning the one or more second-type headers in generating the modified first-type PDU.

21. The method of claim 20, wherein address-aligning comprises inserting one or more padding bits.

22. A receiver for a communication network, the receiver adapted to process a series of first-type protocol data units (PDUs), the receiver comprising:
(a) a disassembly entity adapted to:
(i) receive the series of first-type PDUs, wherein each first-type PDU comprises:
(1) a queue identification (QID);
(2) a transmission sequence number (TSN); and
(3) one or more second-type PDUs; and
(ii) then disassemble each first-type PDU;
(b) a reordering-queue distribution entity adapted to distribute the one or more second-type PDUs to a reordering queue indicated by the QID; and
(c) one or more reordering entities, each adapted to perform reordering processing for the corresponding reordering queue based on the TSN, wherein:
the receiver has a protocol stack comprising a physical layer and a data-link layer; and
the disassembly entity is implemented in the physical layer.

23. A method for processing a series of first-type protocol data units (PDUs) in a receiver in a communication network, the method comprising:
(a) receiving a first-type PDU comprising:
(i) a queue identification (QID);
(ii) a transmission sequence number (TSN); and
(iii) one or more second-type PDUs;
(b) then disassembling the first-type PDU;
(c) then distributing the one or more second-type PDUs to a reordering queue indicated by the QID; and
(d) then performing reordering processing for the corresponding reordering queue based on the TSN, wherein:
step (b) further comprises enveloping each second-type PDU in a corresponding envelope comprising the QID and the TSN;
step (c) comprises distributing each second-type PDU to the reordering queue indicated by the QID in the corresponding envelope; and step (d) comprises performing reordering processing for each second-type PDU based on the TSN in the corresponding envelope.

24. The method of claim 23, wherein:

each second-type PDU comprises a second-type header and a second-type service data unit (SDU); and step (b) further comprises adding one or more padding bits to the enveloped second-type PDU to ensure address alignment.

* * * * *